Feb. 26, 1952 S. C. ROBINSON 2,587,528
EQUALIZER FOR ARTIFICIAL DENTURES
Filed Jan. 12, 1951 2 SHEETS—SHEET 1
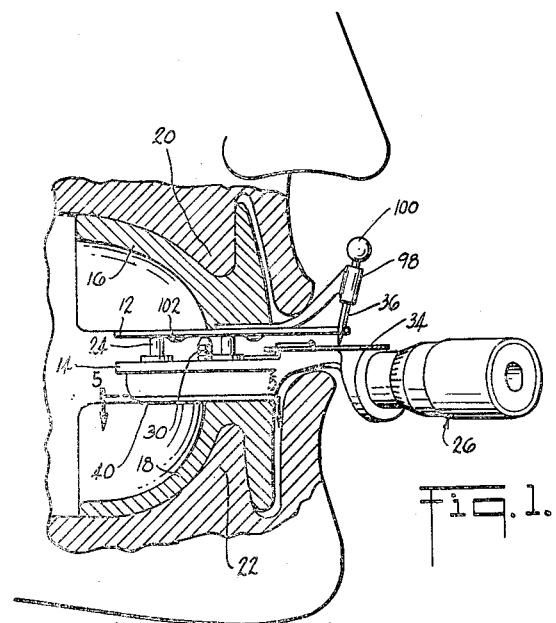
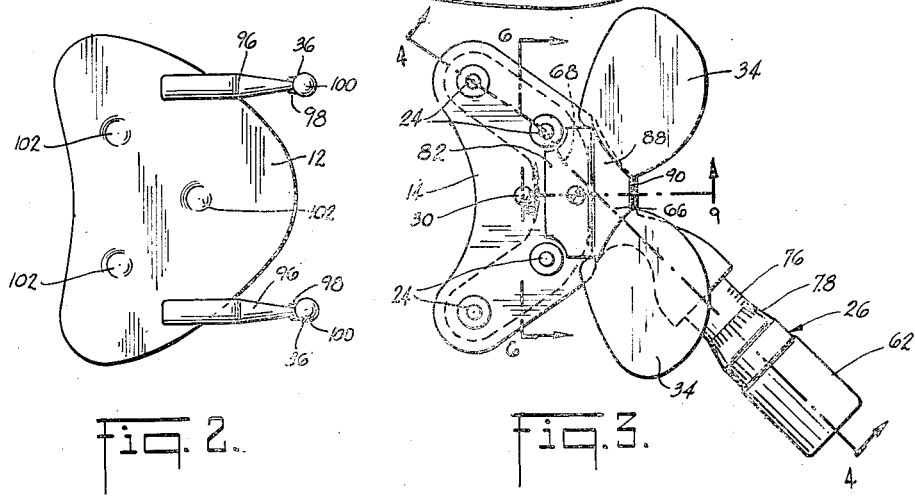
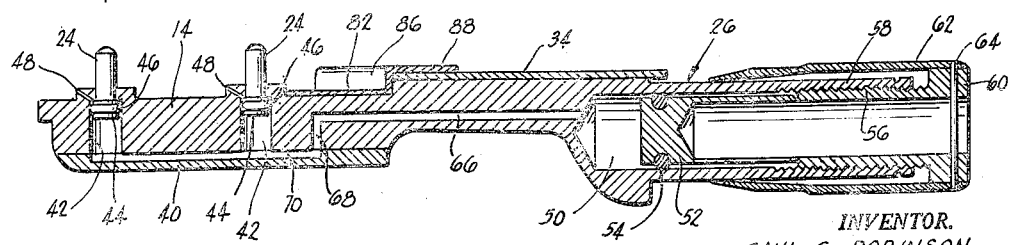
INVENTOR.
SAUL C. ROBINSON
BY
ATTORNEYS Feb. 26, 1952 S. C. ROBINSON 2,587,528
EQUALIZER FOR ARTIFICIAL DENTURES
Filed Jan. 12, 1951 2 SHEETS—SHEET 2
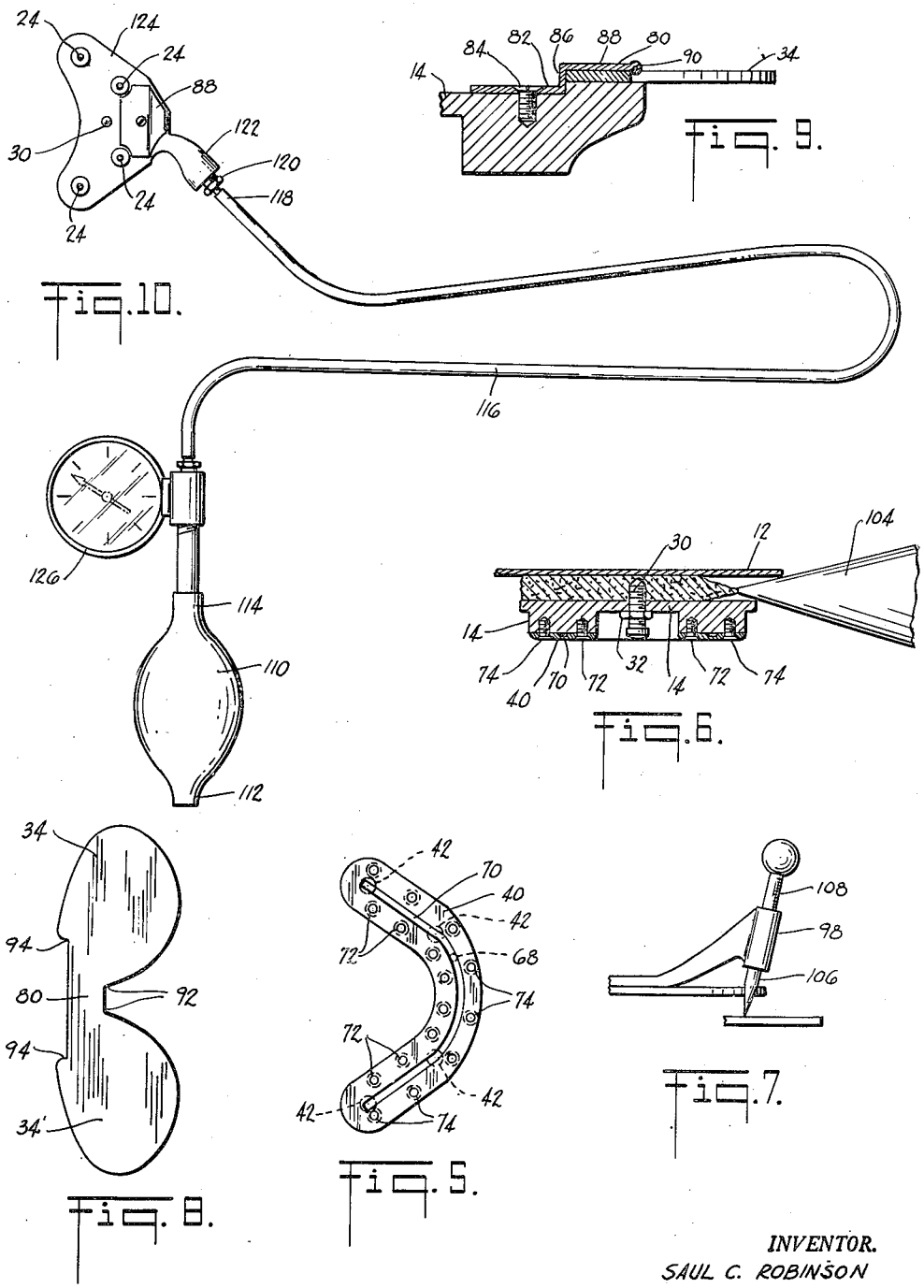
INVENTOR.
SAUL C. ROBINSON
BY James and Franklin
ATTORNEYS Patented Feb. 26, 1952

2,587,528

UNITED STATES PATENT OFFICE 2,587,528

EQUALIZER FOR ARTIFICIAL DENTURES

Saul C. Robinson, Portland, Oreg.

Application January 12, 1951, Serial No. 205,724

18 Claims. (Cl. 32—19)

This invention relates to the making of artificial dentures, and more particularly to apparatus for insuring equalization of pressure on the edentulous ridges.

In the making of artificial dentures procedures are already well established for determining the desired denture space, and also for determining the centric and eccentric positions of the mandible in relation to the maxilla, the latter being done by means of a gothic arch tracer. Trial denture bases are employed with spaced plates, between which plates a quick-setting plaster is inserted to make a record of the desired relation of the bases and plates.

However, apart from the matter of proper denture space and centric relation there is also the matter of obtaining equalized stress or pressure on the ridges. One prior method may be termed a "negative pressure method," in accordance with which the lower member is provided with four spaced studs, and a thin paper or like feeler is slid between the studs and the upper member until the feeler seems equally free at all four points, at which time the patient is asked to hold the bite in that relation until the quick-setting plaster can be inserted for a record. This negative pressure system suffers from the important fault that it does not equalize under functional stress; that is, under biting pressure. The members may seem properly related with no or light pressure, and yet under heavy chewing stress may shift position and assume a slightly different angular relation, and may cause a shift out of centric to eccentric position.

Another past method is the central bearing method. This employs a single pivot located at a central point between the two members, and the theory is that the patient may bite, and in biting will cause the members to shift to such a relation that there is equalized pressure on the ridges. A balance is hoped for because of the use of only a single pivot against which the biting pressure is being applied, and the quick-setting plaster is inserted while the members are under functional stress. However, this method has proved to be a failure in practice. One possible explanation is that it is difficult, and perhaps impossible, to locate the single pivot at the true center of pressure, and thus the application of functional stress may lead to an incorrect angular relation between the members.

This matter of equalization of pressure is extremely important. Unequal stress may lead to shifting of the denture base on the ridges until the teeth come together, and this constant shifting may produce soreness and lack of power because of the pain. The result is not only a loss of masticating efficiency, but what is far worse, a tendency for the bone to resorb. It may grow smaller until the ridges of the patient shrink to as little as half their original height. On the contrary, with a perfectly fitting denture and equalized pressure the ridges are actually stimulated, and retain their good health and full size.

The primary object of the present invention is to obtain equalized pressure on the ridges under functional stress. Another object is to obtain equalized pressure on the ridges while maintaining the proper and desired denture space between the ridges. Still another object is to obtain equalized pressure on the ridges in various relationships of the mandible and maxilla, including the centric and the various eccentric positions. Still further objects are to provide means to indicate the existing relationship, and also to indicate the relative magnitude of the functional stress or biting pressure being exerted by the patient at the time the record is made.

To accomplish the foregoing general objects, and other more particular objects which will hereinafter appear, my invention resides in the equalizer elements and their relation one to another as are hereinafter more particularly described in the specification. The specification is accompanied by drawings, in which:

Fig. 1 is a partially sectioned side elevation showing one form of equalizer in use;

Fig. 2 is a plan view of the upper member;

Fig. 3 is a plan view of the lower member;

Fig. 4 is a section drawn to enlarged scale and taken in the plane of the line 4—4 of Fig. 3.

Fig. 5 is a plan view of a bottom closure, looking at the plane of the line 5—5 of Fig. 1;

Fig. 6 is a transverse section taken approximately in the plane of the line 6—6 of Fig. 3;

Fig. 7 is a side elevation of one form of tracer, drawn to enlarged scale;

Fig. 8 is a plan view of the marking table;

Fig. 9 is a section taken approximately in the plane of the line 9—9 of Fig. 3; and Fig. 10 shows a modified form of the invention.

Referring to the drawing, and more particularly to Figs. 1 through 4, the equalizer comprises spaced, generally horizontal upper and lower members 12 and 14, adapted to be secured, respectively, to temporary bite rims 16 and 18 fitted to the edentulous ridges 20, 22 of the patient. One of these members 12 and 14, preferably the lower member 14, has at least three small vertical cylinders with pistons carrying studs 24 projecting toward and adapted to contact the other member, as is best shown in Fig. 1. The number of cylinders, pistons and studs employed is preferably four, as is most clearly shown in Fig. 3. There is also a source of pressure fluid, here indicated at 26, and flow passages connecting said source to all of the cylinders in common, so that the pressure on the ridges may be equalized during functional stress by the application of a counteracting pressure from the source 26.

In order to maintain the desired denture space between the ridges, one of the members, preferably the lower member 14, is provided with an adjustable spacer screw 30. As is best shown in Fig. 6, the screw 30 is threadedly received in the lower member 14, and is preferably provided with a locknut 32. It will be understood that the desired free space has been determined by conventional methods prior to the present equalization operation, and that the screw 30 is set to fix this desired denture space (or slightly less for a reason explained later) so that it may be reproduced in the mouth of the patient during the present operation.

Reverting to Figs. 1, 2 and 3, the lower member 14 is preferably provided with a marking table 34, and a cooperating stylus or "Gothic arch tracer" 36. Layout fluid may be painted on the marking table 34 to receive a Gothic arch scribing from the stylus or tracer 36, the patient being instructed in the usual manner to assume centric and eccentric positions of the mandible. By referring to the tracing the dentist later may insure that the desired centric or eccentric relation is being maintained while the appropriate quick-setting plaster record is being made. The patient is instructed to bite against the spacer pin 30, and pressure is then applied to the multiple pistons. The pressure on the pistons is inherently equalized because of the fluid nature of the system. The pressure is increased until the upper member is just lifted or freed of the screw 30, which may be determined by using a thin feeler between the screw and the upper member, or by other methods described later. When the functional stress is counteracted by the fluid system instead of the screw, the pressure on the ridges is equalized, and this equalization is obtained not only under functional stress, but also with the desired denture space, and with the upper and lower members in any desired centric or eccentric relation as determined by observation of the Gothic arch tracing.

Considering the mechanism in greater detail, and referring more particularly to Fig. 4, the lower member 14 may be an aluminum or magnesium casting covered at the bottom by means of a bottom plate 40. The part 14 has four cylinders 42 formed therein, these being open at the bottom prior to the addition of the bottom plate 40. The studs 24 are preferably formed integrally with the pistons 44, and the latter are preferably fitted with suitable piston rings, which in the present case are O type rings 46 preferably made of an oil resistant artificial rubber such as neoprene. Fig. 4 shows the pistons and studs in elevated position, but it will be understood that when not under pressure they may move down to a lower position. The cylinders are preferably vented above the pistons so that there will be no resistance to upward movement of the pistons despite possible long accumulation of slight leakage of oil or other fluid past the pistons. For this purpose small vent holes may be drilled through the top of the member 14 to the cylinders, as is indicated at 48.

The number of cylinders and studs may vary, although it is obvious that at least three should be employed in order to establish an equalized relation. I definitely prefer to employ four, two on each side, as is best shown in Fig. 3, in order to equalize the functional stress on the ridges carrying the molar and bicuspids, and also in order to leave the front clear for observation, manipulation and other purposes.

In the present case the pressure source is a master cylinder 50 (Fig. 4) having a master piston 52 with a piston ring 54, which again is preferably of the O type. The rear portion of the piston is provided with a male thread 56 mating with female thread 58 on the inside of the cylinder. The rear end portion 60 of the piston is enlarged and carries a sleeve-like handle 62 which may be appropriately scored or knurled to facilitate grasping and turning the same. The parts 60 and 62 may be secured together by means of a diametric pin 64. It will be evident that by rotating the handle 62 the piston may be advanced, thus forcing fluid, in this case preferably a heavy oil, against the four pistons in the four cylinders.

To connect the source to the cylinders I provide a passage 66 from the cylinder 50 to an upright passage 68, which in turn connects to a U-shaped channel 70 running beneath the four cylinders. Thus, referring to Fig. 5, it will be seen that the bottom plate 40 has an open channel 70 on its upper face, the said channel following a path lying beneath the open lower ends of all four small cylinders 42, the latter being indicated on the drawing by broken lines. The location of the vertical passage is also indicated at 68. The parts 72 and 74 represent two rows of holes for screws which secure the bottom plate against the member 14, as is best shown in Fig. 6. This figure also shows the rectangular shape of the channel 70 when viewed in section.

The master cylinder is preferably disposed at an angle, as is best shown in Fig. 3, because of convenience in mounting the equalizer in an articulator. In Fig. 3 it will be understood that the portion marked 66 of the section line 4—4 happens also to show the direction of the flow passage 66 of Fig. 4 to the point 68 where the vertical passage is located and extends downwardly to the bottom channel 70 previously described.

The outer surface or barrel of the cylinder may be provided with a scale indicated at 76 in Fig. 3, and the forward edge 78 of the handle 62 may be provided with a vernier scale, as is also shown in Fig. 3. Thus an indication of the number of turns or the advance of the piston is available to the dentist, so that he will have some indication of the functional stress or biting pressure being exerted by the patient. This varies greatly from one patient to another, but the indication is nevertheless of value in order to reveal the occasional circumstance of a patient having such sore ridges or such ill-fitting temporary bases that only a feeble bite is obtained, in which case the operation may be interrupted until the undesirable condition is remedied.

The particular marking table which is here illustrated is a dual table consisting of two parts 34 and 34' connected by a central portion 80, best shown in Fig. 8. It is preferably detachably connected to the member 14, and for this purpose the member 14 is provided with a spring holder 88, best shown in Figs. 3 and 9. This has a base portion 82 secured to member 14, as by means of a screw 84. It is bent upward at 86, and forward at 88, and then terminates in a rounded ridge or bead 90. The elevation of the part 88 is such as to receive and firmly hold the central or neck portion 80 of the marking table. The step at 86 mates with a step on the member 14, which in turn fixes the holder against movement about the screw 84. Reverting to Fig. 8, the side edges or notch walls at 92 and 94 are so spaced as to just fit between the parts of the spring holder, and this is also true of the width of the neck portion 80, which just fits within bead 90 of the holder. Thus the arrangement is such that the marking table may be snapped into position, and is very accurately held against movement in any direction by the spring holder, yet may be removed (and inserted) without the use of tools.

Referring now to Figs. 1 and 2, the upper member 12 has a pair of forwardly and upwardly extending arms 96, 96' which carry bearings 98, 98' in which tracers 36 are freely slidable. Each tracer is preferably gravity-loaded by forming the upper end with a ball-shaped weight 100. The lower ends are, of course, sharpened to a fine point.

The member 12 is preferably depressed or indented at several points. In the present case there are three such points indicated at 102 in Fig. 2. These serve to locate the member relative to the quick-setting plaster record formed therebeneath. It will be understood that the bottom of member 12 and the top of member 14 are preliminarily coated with a lubricant or parting medium, so that the parts 12 and 14 are readily separated from the plaster record after the plaster has set. Because of the projection of the studs 20 and the bosses therearound it is a simple matter to recombine the plaster record with the lower member 14 in the exact original relationship, and in the same way, because of the depressions 102, it is a simple matter to recombine the upper member with the plaster record. In this way the two members and the record may be recombined for use in a suitable articulator at a later time when making the dentures.

The plaster is inserted in any desired manner, one method being shown in Fig. 6, in accordance with which the plaster is placed in a collapsible cone 104 made, for example, of cellophane, and the large end of the cone is rolled up or squeezed to eject the plaster into the space between the upper member 12 and the lower member 14.

It was previously stated that pressure is applied and increased until the upper member is freed of the spacer screw or central screw 20. This may be determined by use of a thin feeler, as previously explained. Another method is indicated in Fig. 7, in accordance with which the tracer 106 has a scale 108 formed on its shank. The dentist may observe the location of the scale relative to the bearing 98, while increasing the pressure applied to the equalizing pistons. When an upward movement of the bearing 98 relative to the scale is detected, that fact is an indication that the bite or functional stress has been taken over by the pistons.

As so far described the source of pressure fluid is a master cylinder and piston, and the fluid is a heavy oil. However, this is not essential, and in Fig. 10 I illustrate a modification in which the fluid is compressed air, and in which the source of pressure is a pump, preferably a simple hand-operated bulb 110. This may be of conventional type in having a one-way inlet valve at one end 112, and a one-way discharge valve at the other end 114. The compressed air is fed through a preferably long, slender, flexible tube 116, the other end 118 of which is connected to a fitting 120 screwed into the neck portion 122 of a lower member 124. Except for the fact that this lower member terminates at what would be the inner end of the master cylinder previously described, the lower member 124 is identical with that previously described, it having a central lockable screw 30 for setting the desired denture space, and four studs 24 carried by small pistons, and a spring holder 88 for receiving the marking table. Fig. 10 differs from Fig. 3 in that the marking table is temporarily absent from its spring holder, apart from the permanent omission of the master cylinder and handle. It will be understood that the lower member 124 is employed with an upper member 12 exactly as previously described.

With a pneumatic system of this kind, the simplest method of indicating the bite pressure exerted by the patient is to use a suitable pressure gauge 126 in the system. As before, the pressure is built up until there is an indication that the functional stress is being taken by the studs, rather than the central screw. This indication may be obtained by means of a paper feeler, or by means of markings on the tracer, as shown in Fig. 7, or by other means. At that time the reading on the pressure gauge is an indication of whether or not the patient is exerting adequate bite. The dentist checks the relative position of the mandible by observing the location of the tracer on the marking table, and if the position is that desired, the dentist proceeds with insertion of a quick-setting plaster to make the desired record.

While the specific dimensions of the parts of the unit are neither critical nor an essential part of the invention, it may be helpful to give an example. In the particular example of the invention illustrated the diameter of the small cylinders is 0.148". They must be exactly alike in diameter. The piston rings are of the O type, which tend to roll as the piston moves. The rings have an inside diameter of $\frac{1}{16}$" and an outside diameter of $\frac{1}{8}$", the thickness or diameter of the ring material itself being $\frac{1}{32}$".

The U-shaped channel which connects the four cylinders together is 0.065" wide and 0.030" deep. The master cylinder has a diameter of $\frac{5}{16}$". The piston ring of the master piston has an inside diameter of $\frac{3}{16}$" and an outside diameter of $\frac{5}{16}$", the thickness or diameter of the ring material itself being $\frac{1}{16}$".

The overall operation may be described as follows:

Accurate impressions of the ridges are secured, upon which carefully fitted base plates are constructed; one set for an approximate bite, and one set for corrected occlusal relation records. The first set is used with wax bite rims. These are adjusted in the mouth for denture space, and are sculptured for the position of the anterior teeth. After this is accomplished, an approximate bite is secured in any one of the conventional methods. The casts are placed in these base plates and are luted together, using the indexing of the approximate bite previously secured. These casts are now mounted in an articulator. Since the approximate bite incorporated the denture space, and an approximate relationship of the mandibular cast to the maxillary cast, these relationships are recorded in the articulator.

The second set of base plates is now placed upon the casts which are mounted in the articulator, and compound bite rims constructed thereon. The "occlusal equilibrator" is now set up upon these compound bite rims. It is so set that the central bearing screw contacts the upper member at desired spacing. The incisal path marker or tracer is placed in the center of the marking table. This entire set-up should not disturb the denture space as maintained in the articulator.

Layout fluid is painted on the marking table and the base plates carrying the "occlusal equilibrator" are placed in the mouth. The patient is instructed to close his mouth until he feels the central bearing screw contact the upper member. He is then instructed to shift the mandible forward and backward a number of times, keeping the bearing screw in contact, until the most distal position is reached. During this procedure the Gothic arch tracer will have made a scribing on the marking table. The patient is again instructed to shift the mandible forward and backward, and stopped when the tracer pin is at the most anterior point of the scribing. Now the patient is instructed to open slightly and a thin parchment paper feeler is inserted between the central bearing screw and the upper member. He is instructed to close, at which time the dentist must observe that the Gothic arch tracing pin is at the most anterior point of the tracing on the tracing table. If the tracing pin is not at the most anterior point the patient has allowed the mandible to shift forward and must be instructed to allow it to drop back until the tracer pin is at the most anterior point of the scribing. The dentist then applies pressure, instructing the patient to maintain constant bite pressure.

The dentist turns the knob or applies pressure with one hand, while pulling on the paper feeler with the other hand. When he feels the paper feeler loosen he stops, and instructs the patient to shift the mandible to the right and return to centric position. He then instructs the patient to shift the mandible to left and return to the centric position. The patient must maintain pressure at all times during the excursions of the mandible. The resultant scribings of the Gothic arch tracer on the marking table will be a Gothic arch secured under functional stress.

After the Gothic arch tracing is made under functional stress the calibration on the scale is noted. This calibration determines the amount of pressure the patient can exert without overloading the tissues on the ridges. This is true because the patient will bite only as hard as the pain sensation in the tissues will allow. The dentist is aware of this tolerance limit when the parchment paper feeler loosens.

The patient is now instructed to drop the mandible back so that the Gothic arch tracer pin is at the apex of the scribing, and to create pressure. An index of this relationship is obtained by inserting a quick setting plaster between the upper and lower members of the "occlusal equilibrator." The dentist has now established a functional centric occlusal relation record.

The recording of functional eccentric relation records is essentially the same. The patient is instructed to shift to protrusive, right, or left, as the case may be, and exert pressure. Plaster is inserted between the sections and the index is made.

The casts are now remounted in the articulator, using the centric relation record index. If the articulator is an adjustable one, the eccentric indexes are used for the final adjustment of the articulator.

It is believed that the construction, operation, and method of use of my improved equalizer for making artificial dentures, as well as the advantages thereof, will be apparent from the foregoing detailed description. The invention provides a means for creating an equilibration of the occluding teeth of artificial dentures. It produces an equalization of pressures transmitted to the edentulous ridges during the process of mastication. It stablizes the trial denture bases during the recording of the relationships of the mandible to the maxilla in the centric and eccentric positions of the mandible. Since the stablization of the denture bases is created by equalization of pressures during functional stress, masticatory efficiency is greatly enhanced.

It will be apparent that while I have shown and described the invention in several preferred forms, changes may be made in the structures disclosed without departing from the scope of the invention as sought to be defined in the following claims.

1. An equalizer for use in the making of artificial dentures, said equalizer comprising spaced, generally horizontal upper and lower members adapted to be used with temporary bite rims fitted to the edentulous ridges of the patient, one of said members having a plurality of small vertical cylinders with pistons and studs projecting toward and adapted to contact the other member, a source of pressure fluid, and flow passages connecting said source to all of said cylinders, whereby the pressure on the ridges may be equalized during functional stress and preparatory to the insertion of a quick-setting plaster between said upper and lower members as a record.

2. An equalizer for use in the making of artificial dentures, said equalizer comprising spaced, generally horizontal upper and lower members adapted to be used with temporary bite rims fitted to the edentulous ridges of the patient, the lower of said members having four spaced vertical cylinders with pistons and studs projecting upward to contact the upper member, a source of pressure fluid, and flow passages connecting said source to all four of said cylinders, whereby the pressure on the ridges may be equalized during functional stress and preparatory to the insertion of a quick setting record plaster between said upper and lower members.

3. An equalizer for use in the making of artifical dentures, said equalizer comprising spaced, generally horizontal upper and lower members adapted to be used with temporary bite rims fitted to the edentulous ridges of the patient, one of said members having a centrally disposed adjustable screw for fixing the desired denture space when in contact with the other member, one of said members also having a plurality of spaced vertical cylinders distributed about said screw, each of said cylinders having a piston and stud projecting to contact the other member, a source of pressure fluid, and flow passages connecting said source to all of said cylinders, whereby the pressure on the ridges may be equalized during functional stress preparatory to the insertion of a quick-setting record plaster between said upper and lower members.

4. An equalizer for use in the making of artificial dentures, said equalizer comprising spaced generally horizontal upper and lower members adapted to be used with temporary bite rims fitted to the edentulous ridges of the patient, one of said members having a plurality of spaced vertical cylinders, each of said cylinders having a piston and stud projecting to contact the other member, a source of pressure fluid, flow passages connecting said source to all of said cylinders, the lower member having a marking table, and the upper member having a Gothic arch tracer, whereby the pressure on the ridges may be equalized during functional stress with the members in desired centric or eccentric relation preparatory to the insertion of a quick-setting record plaster between said upper and lower members.

5. An equalizer for use in the making of artificial dentures, said equalizer comprising spaced, generally horizontal upper and lower members adapted to be used with temporary bite rims fitted to the edentulous ridges of the patient, one of said members having a centrally disposed adjustable screw for fixing the desired denture space when in contact with the other member, one of said members also having a plurality of spaced vertical cylinders distributed about said screw, each of said cylinders having a piston and stud projecting to contact the other member, a source of pressure fluid, flow passages connecting said source to all of said cylinders, the lower member having a marking table and the upper member having a Gothic arch tracer, whereby the pressure on the ridges may be equalized during functional stress with the members in desired centric or eccentric relation preparatory to the insertion of a quick-setting record plaster between said upper and lower members.

6. An equalizer for use in the making of artificial dentures, said equalizer comprising spaced, generally horizontal upper and lower members adapted to be used with temporary bite rims fitted to the edentulous ridges of the patient, the lower of said members having a centrally disposed, upwardly projecting screw for fixing the desired denture space when in contact with the upper member, said lower member also having four spaced vertical cylinders distributed about said screw, each of said cylinders having a piston and stud projecting upward to contact the upper member, a source of pressure fluid, and flow passages connecting said source to all four of said cylinders, whereby the pressure on the ridges may be equalized during functional stress preparatory to the insertion of a quick-setting record plaster between said upper and lower members.

7. An equalizer for use in the making of artificial dentures, said equalizer comprising spaced, generally horizontal upper and lower members adapted to be used with temporary bite rims fitted to the edentulous ridges of the patient, said lower member having four spaced vertical cylinders, each of said cylinders having a piston and stud projecting upward to contact the upper member, a source of pressure fluid, flow passages connecting said source to all four of said cylinders, said lower member having a marking table, and said upper member having a Gothic arch tracer, whereby the pressure on the ridges may be equalized during functional stress and with the members in desired centric or eccentric relation, preparatory to the insertion of a quick-setting record plaster between said upper and lower members.

8. An equalizer for use in the making of artificial dentures, said equalizer comprising spaced, generally horizontal upper and lower members adapted to be used with temporary bite rims fitted to the edentulous ridges of the patient, the lower of said members having a centrally disposed, upwardly projecting screw for fixing the desired denture space when in contact with the upper member, said lower member also having four spaced vertical cylinders distributed about said screw, each of said cylinders having a piston and stud projecting upward to contact the upper member, a source of pressure fluid, flow passages connecting said source to all four of said cylinders, said lower member having a marking table, and said upper member having a Gothic arch tracer, whereby the pressure on the ridges may be equalized during functional stress with the members in desired centric or eccentric relation preparatory to the insertion of a quick-setting record plaster between said upper and lower members.

9. An equalizer as defined in claim 2, in which the source of pressure fluid comprises a master cylinder projecting outwardly from the lower member, a master piston slidable in said cylinder, and a handle and screw mechanism for advancing said piston.

10. An equalizer as defined in claim 2, in which the source of pressure fluid comprises a master cylinder projecting outwardly from the lower member, a master piston slidable in said cylinder, a handle and screw mechanism for advancing said piston, and a scale for indicating the relative advance of the piston.

11. An equalizer as defined in claim 6, in which the source of pressure fluid comprises a master cylinder projecting outwardly from the lower member, a master piston slidable in said cylinder, and a handle and screw mechanism for advancing said piston.

12. An equalizer as defined in claim 1, in which the source of pressure fluid comprises a pump mechanism, and a flexible tube leading from said pump mechanism to said cylinder carrying member.

13. An equalizer as defined in claim 1, in which the source of pressure fluid comprises a pump mechanism, a flexible tube leading from said pump mechanism to said cylinder carrying member, and a pressure gauge connected to said system to indicate the pressure being exerted on the pistons.

14. An equalizer as defined in claim 6, in which the source of pressure fluid comprises a pump mechanism, and a slender flexible tube leading from said pump mechanism to said lower member.

15. An equalizer as defined in claim 5, in which the Gothic arch tracer is freely slidable in a guide, and is provided with score lines to indicate the position of the tracer relative to the guide, whereby an increase in free space resulting from pressure on the pistons will be indicated by relative movement of the tracer and guide.

16. An equalizer as defined in claim 8, in which the Gothic arch tracer is freely slidable in a guide, and is provided with score lines to indicate the position of the tracer relative to the guide, whereby an increase in free space resulting from pressure on the pistons will be indicated by relative movement of the tracer and guide.

17. An equalizer as defined in claim 4, in which the marking table is a dual table, and in which there are two spaced tracers cooperating respectively with said two marking tables.

18. An equalizer as defined in claim 7, in which the marking table is a dual table, and in which there are two spaced tracers cooperating respectively with said two marking tables.

SAUL C. ROBINSON.

REFERENCES CITED

The following references are of record in the file of this patent:

UNITED STATES PATENTS

| Number | Name | Date |
|---|---|---|
| 1,706,179 | McBean | Mar. 19, 1929 |
| 2,562,106 | Leathers | July 24, 1951 |